United States Patent [19]

Laker et al.

[11] 4,084,261

[45] Apr. 11, 1978

[54] GRAPHICAL DISPLAY APPARATUS

[75] Inventors: Robert William Laker, Polegate; Harold Charles Arthur Hankins, Glossop; Gordon Hughes, Macclesfield, all of England

[73] Assignee: International Computers Limited, London, England

[21] Appl. No.: 660,689

[22] Filed: Feb. 23, 1976

[30] Foreign Application Priority Data

Feb. 27, 1975 United Kingdom ................. 8152/75

[51] Int. Cl.[2] ................................................. G06F 3/14

[52] U.S. Cl. ............................. 364/900; 340/324 AD

[58] Field of Search ...................... 340/172.5, 324 AD

[56] References Cited

U.S. PATENT DOCUMENTS

| | | | |
|---|---|---|---|
| 3,471,848 | 10/1969 | Manber | 340/324 AD |
| 3,534,338 | 10/1970 | Christensen et al. | 340/172.5 |
| 3,821,731 | 6/1974 | Levine | 340/324 AD |
| 3,848,232 | 11/1974 | Leibler et al. | 340/172.5 |

*Primary Examiner*—Gareth D. Shaw
*Assistant Examiner*—Thomas M. Heckler
*Attorney, Agent, or Firm*—Hane, Roberts, Spiecens & Cohen

[57] ABSTRACT

A graphic display apparatus in which the data to be displayed is stored as two types of data word, one type representing groups of increments of beam displacement of a beam displacement tube and the other representing differences between the data constituting a raster line and that of next succeeding line. The data for each line formed from the first type of words is temporarily stored in a line store while being displayed on the tube. The contents of the line store are modified according to any second type words received during the display period so as to convert the stored data into that for the next line to be displayed.

5 Claims, 5 Drawing Figures

GRAPHICAL DISPLAY APPARATUS

BACKGROUND OF THE INVENTION

1. Field of the Invention

The present invention relates to graphical display apparatus.

2. Description of the Prior Art

It has previously been proposed to employ cathode ray tubes for the display of, for example, alpha-numerical information, particularly for the visual display of data derived from an information store such as is used in electronic data processing apparatus. Such a display is conveniently presented on a cathode ray tube whose electron beam is displaced in a succession of horizontal lines spaced apart in a vertical direction by a raster scan in a manner similar to that employed in the presentation of television pictures. It has also been proposed to display graphical information by causing the electron beam to trace out lines on the tube face. The display of graphical data on a tube driven by a line raster has hitherto presented considerable difficulties in practice due to the considerable amount of data storage required.

SUMMARY OF THE INVENTION The present invention deals with a graphical display system in which graphics are displayed on a beam type display device that exhibits a television raster scan-line pattern in which the beam traverses a generally parallel series of scan lines.

In representing the display two types of code groups are used. The first specifies the number of scan increments of the beam from one transition to a different state of illumination to the next. In the preferred embodiment this code group may be split into two or more words, the first word or words representing a number of increments with no transition and the final one representing a number of increments which terminates with the transition.

The second type of code group represents one or more transitions by specifying, for each transition, the manner in which it is correlated with a transition in the line previously scanned.

The code groups representing the entire display are stored and output repeatedly to refresh the display. A line store holds data characteristic of the state of illumination of each of the scan increments of a scan line and its contents are output to control the beam during the scan of that line. Simultaneously, data defining the next line to be scanned is introduced into the line store in response to decoding of the successive stored code groups.

If the group is of the first type, the appropriate data is introduced for as many scan increments as are specified by the code group. If it is of the seocnd type, data being output to control the beam is also reintroduced into the line store, correlated with its previous position according to the code group, until the final transition defined by the code group is detected, when the reintroduction is terminated.

Apparatus embodying the present invention will now be described with reference to the accompanying drawings in which.

DESCRIPTION OF PREFERRED EMBODIMENT

Figure 1:
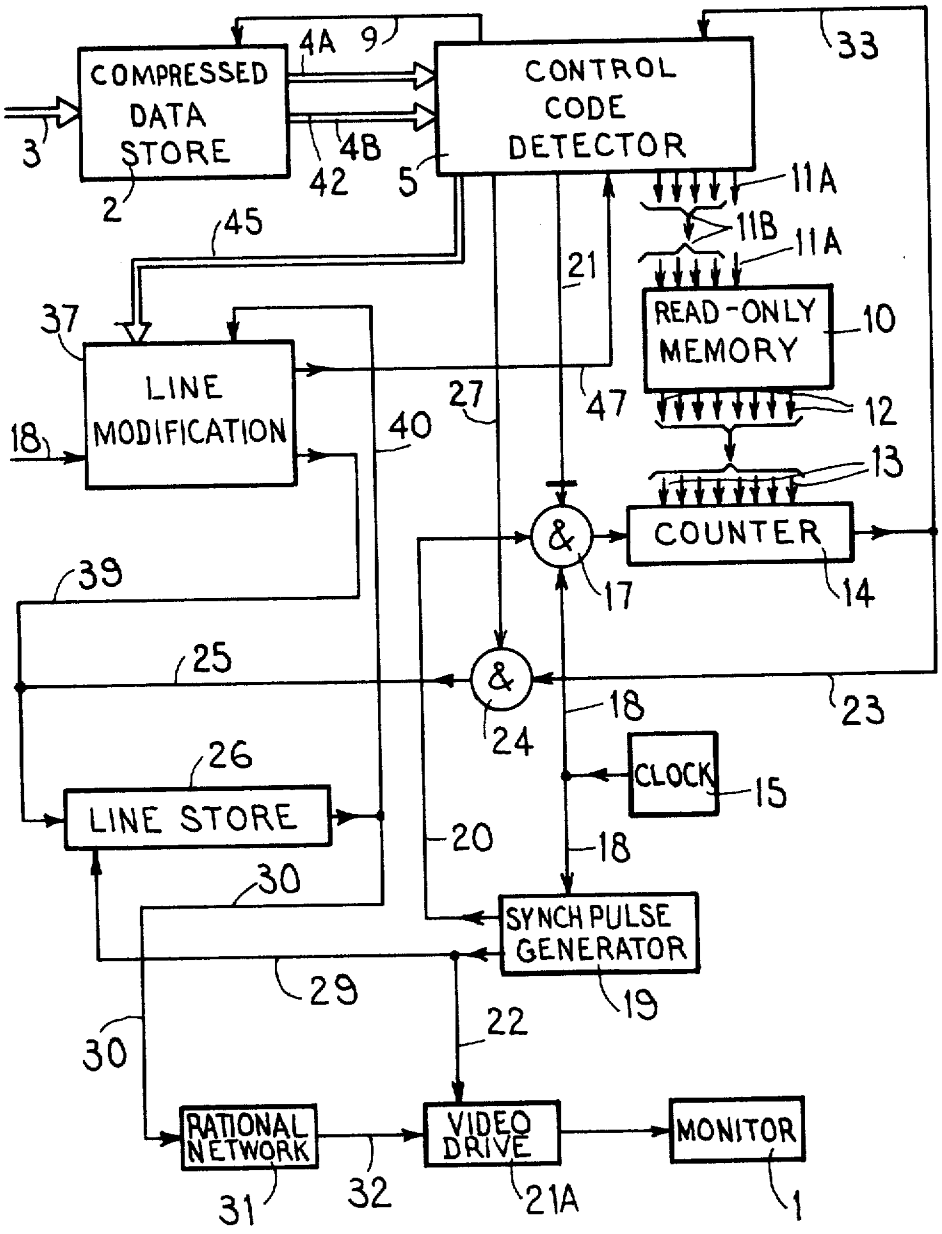
FIG. 1 shows in block schematic form a graphical display system.

Referring now to the drawing, the display system includes a display unit 1. Conveniently the display unit 1 may be a television monitor so that the display is then presented on a raster consisting of lines successively each displaced from its predecessor. The spacing of the lines is controlled by the raster generator of the monitor and for the sake of simplicity and convenience, in order to use standardised equipment, the line displacement and frame scan times are chosen to be compatible with those of television practice. Thus, conveniently 313 lines per frame are provided at a rate of 50 frames per second. This avoids, but is compatible with, the interlaced scan of a standard television monitor. Such a raster makes it convenient to display an image of 256 × 256 display elements, but it will be realised that other scan criteria may be used for different element matrices.

A random access store 2 having a conventional address counter arrangement (not shown) is used for the storage of data relating to the display elements of the individual lines and such data is entered into the store 2 over an input line 3. The input data is expressed in compressed form in data blocks which can conveniently be considered as words according to a predetermined compression code. Such a code, and the derivation of the code words required is described in detail in a paper entitled "Dictionary Look-up Encoding of Graphics Data" by H. E. White, M. D. Lippman and K. H. Powers, published in the proceedings of a Simposium on Picture Bandwidth Compression by The Massachusetts Institute of Technology, Cambridge, Mass., U.S.A. in April 1969.

Briefly the compression coding process permits the graphical content of each line in the display scan to be expressed in terms of the displacement of the beam (called herein the "run-length") measured in predetermined increments between adjacent transitions of the display from bright to dark and vice versa. In the present example each line is assumed to contain 256 increments of displacement and the possible code expressions for the specification of the contents of a line are set out in Table 1 below. The convention is observed that a transition is expressed as a one bit, while the beam displacement increments between transitions are each expressed as zero bits. Thus the expression "001" for beam shifting signifies a three-increment beam movement in which a transition at the third increment is preceded by two increments of movement in which no transition occurs. Those expressions in which a transition occurs in the final increment are called "terminated string codes", while those expressions which merely indicate beam movement without the occurrence of a transition are called "unterminated string codes" and are expressed as a code representing a number of zeros.

In addition to the string codes described there is a further group of code expressions which are termed correlation codes and whose purpose will be described below.

TABLE I

| code expression | beam movement represented | |
|---|---|---|
| 00000001 | 25 zeros | (unterminated string) |
| 00000010 | 30 zeros | " |
| 00000011 | 35 zeros | " |
| 00000100 | 40 zeros | " |
| 00000101 | 45 zeros | " |
| 00000110 | 50 zeros | " |
| 00000111 | 75 zeros | " |
| 00001000 | 100 zeros | " |
| 00001001 | 125 zeros | " |
| 00001010 | 150 zeros | " |
| 00001011 | 175 zeros | " |
| 00001100 | 200 zeros | " |
| 00001101 | 225 zeros | " |
| 00001110 | 250 zeros | " |
| 0001 | 1 | (terminated string) |
| 0010 | 01 | " |
| 0011 | 001 | " |
| 0100 | 0001 | " |
| 0101 | 00001 | " |
| 0110 | 5 zeros | (unterminated string) |
| 0111 | 10 zeros | " |
| 1000 | 15 zeros | " |
| 1001 | 20 zeros | " |
| 1010 | R | (correlation code) |
| 1011 | L | " |
| 1100 | S | " |
| 1101 | SS | " |
| 1110 | SSS | " |

It will be seen from Table 1 that all the eight-bit words represent unterminated strings of different run-lengths and that these words are identifiable by reason of their four most significant binary digits being zeros. All of the four-bit words of the code contain one-bits in different combinations. The store 2 includes an addressing system driven by a counter (not shown) so that the store contents are read out sequentially and cyclically by stepping the counter.

The words in the store 2 are read out four bits at a time such that the store 2 must be addressed once for a four-bit word, and twice for an eight-bit word. The feed of the data words to the store 2 is indicated at 3. These words can be obtained from a central processor operating upon the original graphical display.

Figure 2:
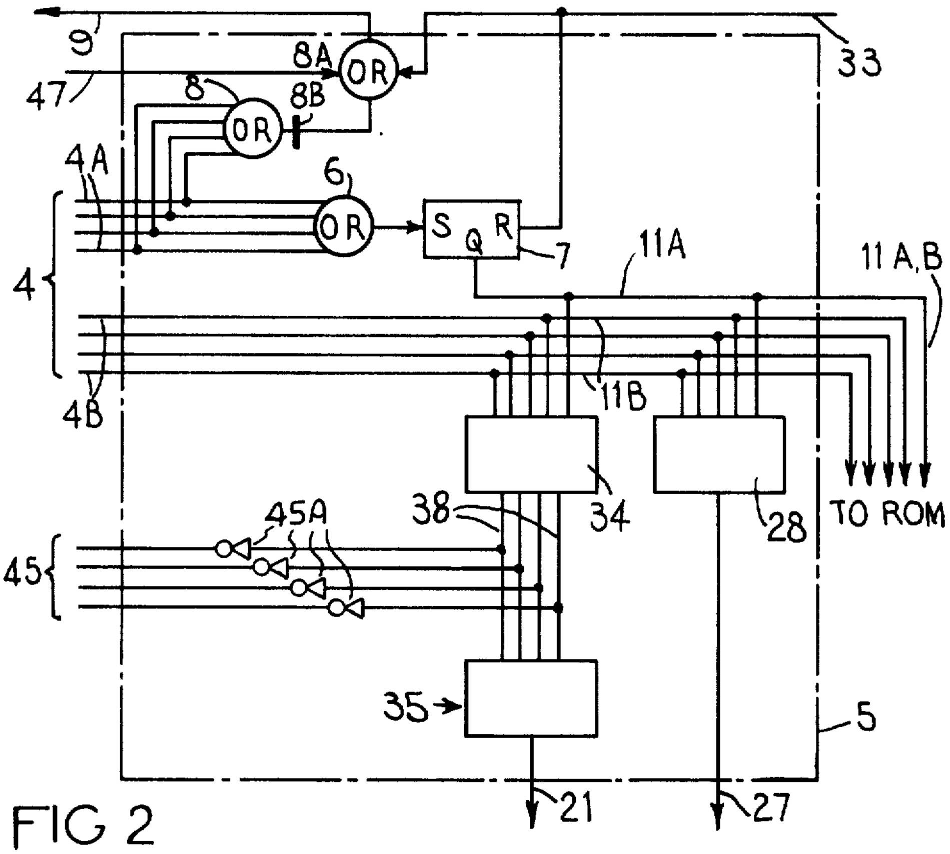
FIG. 2 is a schematic circuit diagram of a detail of the display system of FIG. 1.

The four bits output on any one occasion the store 2 is addressed are supplied along lines 4, shown bracketed in FIG. 2, to a control code detector unit 5.

The detector unit 5 receives the words and performs a number of identification operations on the words. For convenience the contents of the unit 5 will be considered in conjunction with the description of the identification operations effected by the unit.

The four bits are supplied along a group of lines 4A and a group of data lines 4B. The group 4A connects with circuitry whose basic function, as will be explained in more detail, is to recognize when the four bits output from the store are all zero and to cause the next four bits to be treated as the second four bits of an eight-bit code. The data lines 4B connect with circuitry which responds to the 'one' bits in both the second four bits of an eight-bit code and the four-bit codes. The lines 4A connect, via an OR gate 6 followed by an inverted 6A, with a bistable 7 which is normally in its reset condition. When the four bits output from the store 2 are all zero (indicating the first part of an eight-bit code) a 'one' is produced from the inverter 6A which sets the bistable 7 and causes a 'one' to be output as an indicator bit on a line 11A. The bistable remains set for the following four bits and the indicator bit then shows that they are the second part of the eight-bit code. If the incoming four bits contain a 'one' there is no output from the inverter 6A and the bistable 7 is not affected. Thus, is the bits form a four-bit code there will be a 'zero' signal on the line 11A as an indication of that fact. The lines 4A are connected to a further OR gate 8 whose output is connected by way of inverter means 8B to a further OR gate 8A. The inverted output from the OR gate 8 produces by way of a further OR gate 8A, a pulse on a line 9, which connects with the store 2 in such manner that the pulse causes the store to deliver a further four bits to the code detector. That is to say the second four bits of the eight-bit word.

The setting of the bistable 7 to produce a 'one' provides a signal which is applied to a read only memory unit 10 by way of a line 11A. The memory unit 10 interprets the signal as an indicator during the processing of the next four bits that they are the data part of an unterminated string code defining a string of zeros with a run length between 25 and 250 increments of beam displacement of the monitor 1.

On receipt of the pulse on the line 9 the second part of the word is provided from the store 2, which latter word part comprises the four bits of least significance. The second word part passes along both the lines 4A and 4B, but has an effect only on the circuitry connected to the latter.

The lines 4B connect by way of data lines 11B with further inputs of the read only memory unit 10.

In the case of a four bit word i.e., those representing the terminated string codes,, the unterminated string codes representing movements, between five to 20 zeros, and the so-called correlation codes; these words also pass from the store 2 along the lines 4B, and thus along the data lines 11B to the memory unit 10.

Returning now to FIG. 1 the read only memory serves as a look-up table and converts the code inputs applied thereto in to an eight-bit expression which represents, in binary code, the total scan displacement run length specified by the particular code applied thereto. This binary code expression is made available on lines 12 which are connected respectively to stage setting lines 13 of an eight-bit counter 14 so that the counter 14 is forcibly set to the total number of increments of beam shifting specified by the codes applied to the memory 10. The counter 14 is decremented by pulses from a clock pulse source 15 over a line 18 to an AND gate 17.

The gate 17 is also connected to receive two further control signals. One of these is derived from a synchronisation pulse generator 19 along a line 20. The pulse generator 19 resembles a line time base generator and is connected to control a video drive circuitry 21A of the monitor 1, by way of a line 22. Hence the generator 19 ensures that the gate 17 is opened to permit decrementing of the counter 14 only whilst a line scan is taking place, the gate 17 being closed during flyback.

The second of the further inputs is applied to the gate 17 along a line 21, from the unit 5 and is derived from the lines 11A and 11B by means of logic circuitry (to be discussed hereinafter), and is indicative of the presence of a correlation code on the data lines 4B and thus the lines 11B.

The above mentioned clock pulse source 15 produces a pulse for every increment of movement of the line scan of the monitor 1 so that the counter 14 will register zero at the conclusion of the scan displacement specified by the string code under consideration.

The output from the counter 14 is applied by way of a line 23 to a first input of an 'AND' gate 24, whose output side is connected by a line 25 to the input side of a line store 26.

Figure 3:
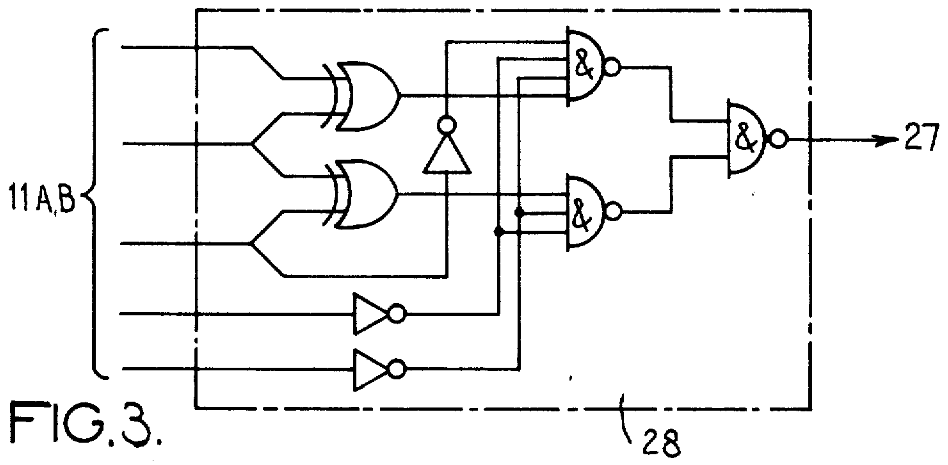
FIG. 3 is a logic diagram of one of the components of the circuit shown in FIG. 2.

The opening of the gate 24 is controlled by a control signal derived from the unit 5 by way of the line 27. This control signal is indicative of the detection by the unit 5 of the presence of a terminated string code on the lines 11A and 11B. The control signals are derived from the code words obtained from the store 2 by a logic circuit 28 (FIG. 3). This circuit includes a combination of gates which combine the four least significant bits and the indicator bit in such manner that whenever the word from the store 2 is indicative of a terminated string code the gate 24 is opened. Details of the logic circuit 28 are shown in FIG. 3. Since it is thought that the details are self explanatory a detailed description is not thought necessary.

In other words the gate 24 is opened only when a terminated string code is received by the detector unit 5, and is closed whilst unterminated string codes, and correlation codes are being processed by the detector.

It therefore follows that for the unterminated string codes the count is decremented without the counter zero output count being transferred to the store 26, and that whenever a terminated string code is present—the zero count output from the counter 14 is applied to the line store 26 to enter a 'one' into the store 26. This line store 26 is a shift register having as many stages as there are scan increments in a line. The store 26 is controlled by a pulse train which is derived over a line 29 from the synchronisation pulse generator 19. With this arrangement the 'one' obtained from the counter is effectively set into the store 26 in the correct position in relation to the position the related data is to occupy along the raster line of the monitor.

The shift control pulses are inhibited during flyback. The output of the line store 26 comprises indications of light/dark or dark/light transitions and is connected over a line 30 to a rationalisation network 31 which (as discussed hereinafter) can be a dividing network.

In practice the delay introduced by the shifting of the contents of the line store 26 is such that the transitions indicated by the entry of the 'one' bits over the lines 23, 25, into the store 26 occur at the store output 30 at the corrent time in relation to the progress of the scan.

For practical purposes this delay may be considered as equivalent to a single line-scan delay so that writing of the preceding line on the monitor 1 takes place as the current line transition information is in the process of being assembled in the line store 26 over the line 23. The actual writing of a line on the monitor is accomplished by connecting an output from the rationalisation network 31 over a line 32 to the video drive circuit 21A.

The rationalisation network 31 is arranged to provide facilities for converting the simple transition indications from the counter 14 into bright-up control instructions for the video drive. For example, in a simple form where each successive transition is of opposite sense to that which preceded it (i.e. a bright-to-dark transition is always followed by a dark-to-bright and vice versa) then the network 31 may be a simple divide-by-two circuit employing, say, bistable which is alternately set and unset. The output from the network 31 will then carry a signal in response to alternate ones of the transition signals. Such an output is then connected to control the application of bright-up beam current to the monitor.

The 'zero' count signal from the counter 14 is applied by way of a line 33 to the detector unit 5. This zero count signal on the line 33 is used to reset the bistable 7 (FIG. 2) so that the output thereof reverts to 'zero' thereby to remove the indicator bit from the line 11A. It will be appreciated that this resetting of the bistable will take place when the detector unit has processed both parts of the eight-bit words and that the zero-count signal will have no effect on the bistable when the word, which has just been processed, was a terminated string code or a correlation code.

The zero count signal is also applied to the OR gate 8A (FIG. 2) to cause the latter to produce a pulse on the line 9, which causes the store 2 to apply the next word to the detector unit 5, that is to say the pulse on the line 9 updates the address counter (not shown) of the store 2.

The description as so far considered deals with the arrangement and operation of the apparatus when processing eight bit words and terminated string codes. In the course of such description reference has been made to correlation codes, and mention has been made of a logic circuitry for producing a control signal for operating the gate 17 (FIG. 1) which controls application of stepping pulses to the decrementing counter.

It is now proposed to consider the significance of the so-called correlation codes, and the manner in which they are used.

These codes have been provided with a view to enhancing the effective storage capability, and compression of the original display in that where ever two successive lines of a display are the same as or very similar to each other, code words which are indicative of the equivalence and differences between succeeding lines are utilised. The modification to the arrangements for processing the words makes use of the so-called correlation codes as set out in Table 1. As will be seen from the table, five such codes are provided, although it will be obvious that additional codes are possible. Of those set out, the code R indicates that the next-occurring transition in the present line is shifted by one increment right from the position it occupied in the previous line. Similarly the code L indicates that the next occurring transition is to be shifted left by one increment in the present line, while the code S, indicates that the next transition is to occur in the same position in the next line as it did in the current one. These correlation statements may be combined or, as in this case, repeated to specify more than one successive transition. Thus, the codes SS and SSS respectively indicate that the next two or three transitions are to occur in the same relative positions in the next line as they did in the current one.

The correlation or line modification codes are decoded by the code detector unit for this purpose the latter includes the logic circuit 34 (FIGS. 2 and 4) and the logic circuit 35.

The circuit 34 is connected to the lines 11A and 11B and is arranged to produce from the correlation codes applied thereto a group of four signals R, SA, SB and L on four output lines 38 according to the following Table II

TABLE II

| Code | R | SA | SB | L | Counter Set To |
|---|---|---|---|---|---|
| | Lines Set To | | | | |
| R | 1 | 0 | 0 | 0 | 1 |
| L | 0 | 0 | 0 | 1 | 1 |
| S | 0 | 1 | 0 | 0 | 1 |
| SS | 0 | 0 | 1 | 0 | 2 |
| SSS | 0 | 1 | 1 | 0 | 3 |
| run length | 0 | 0 | 0 | 0 | 0 |

Figure 4:
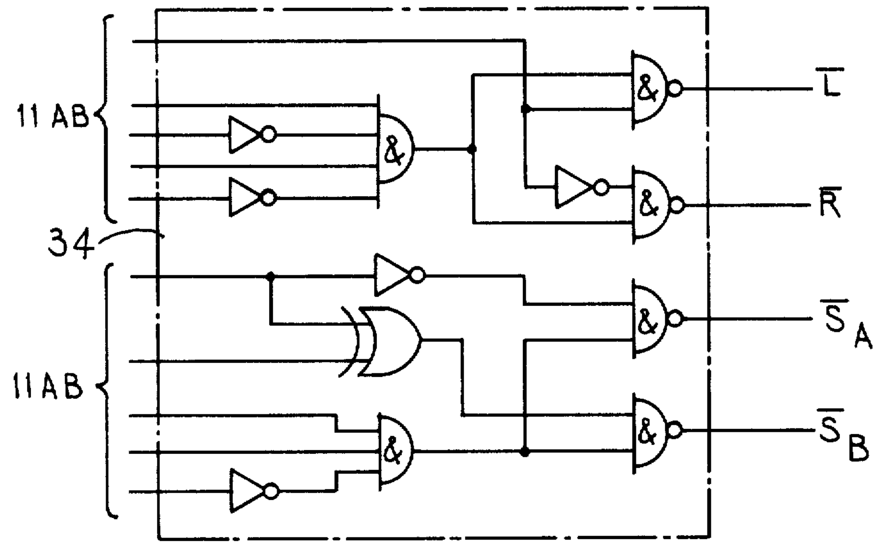
FIG. 4 is a logic diagram of a further component of the circuit shown in FIG. 2.

The logic circuit 34 therefore includes a suitable arrangement of gates such as that shown in FIG. 4. Since it is believed that the logic of the circuit of FIG.4 is self explanatory further description is not thought necessary. The particular embodiment of the logic circuit disclosed in FIG. 4 produces as its outputs the signals $\overline{L}$ $\overline{R}$ $\overline{SA}$ and $\overline{SB}$. There is no particular significance in this and is essentially a matter of convenience in component selection.

The outputs $\overline{L}$ $\overline{R}$ $\overline{SA}$ and $\overline{SB}$ on the lines 38 from the circuit 34 are applied to the input of the further logic circuit 35 which latter essentially includes an OR gate which is responsive to any one of these inputs and from any such input produces an output on the line 21 which is indicative that a correlation code has been received and thus closes the gate 17 (FIG. 1).

In addition, as will be seen from FIG. 1 the outputs from the circuit 34 are used as control inputs for a line modification circuit 37 which modifies the data of the line stored in the line store 26 in accordance with the differences between the line on the store and the next succeeding line to which the correlation code relates.

Figure 5:
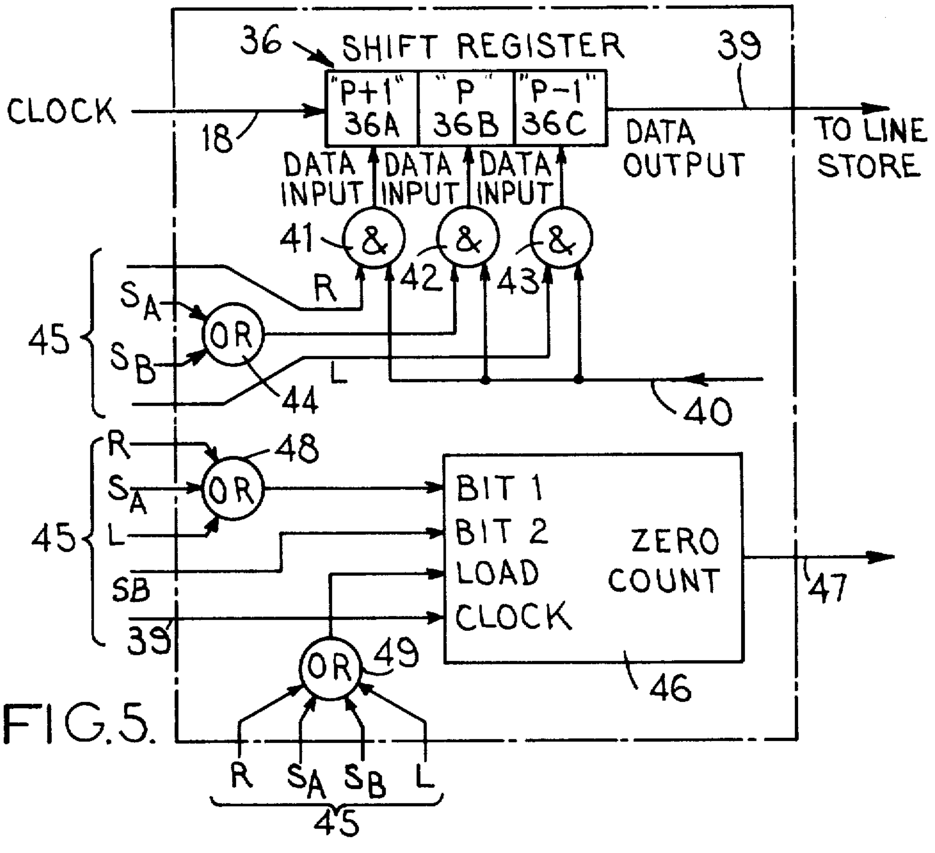
FIG. 5 is a logic diagram of a further detail of the circuit of FIG. 1.

The line modification circuit is schematically illustrated in FIG. 5.

In FIG. 5, a shift register 36, having three stages 36A, 36B and 36C, is clocked by clock pulses from the clock 15 along the line 18.

The data output side of the register 36 is applied by way of the data output line 39 to the input side of the line store 26.

The data input to the shift register 36 is obtained from the output side of the line store 26 by way of a line 40, the output being applied simultaneously to first inputs of a group of AND gates 41, 42 and 43, whose outputs are respectively connected to the stages 36A, 36B, and 36C of the shift register 36.

Each AND gate 41, 42, 43 has a second input. These second inputs are connected respectively to receive from the logic circuit 34 the signals R; the signal SA, or SB by way of an OR gate 44; and the signal L. These signals are transferred from the logic circuit 34 by way of a control signal line group illustrated at 45 in FIG. 5. A series of inverters 45A is included in the lines 45 to convert the signals $\overline{L}$ $\overline{R}$ $\overline{SA}$ and $\overline{SB}$ to L, R, SA and SB respectively.

The circuit of FIG. 5 also includes a clock unit 46, which is of the decrementing type and which is arranged to produce a zero-output signal at an output line 47.

The count of the counter is set according to Table II and to enable this the counter has a first input, to the bit 1 position of the counter, which is connected through an OR gate 48 to receive the control signals R; SA and L provided on the lines 45. The counter has a second input, to the bit 2 position of the counter, which is connected to receive the SB signal. The counter is clocked by the output signal on the line 39 from the shift register 36, to the line store 26.

In addition, the counter unit receives at a further input identified as LOAD in FIG. 5, a control signal from an OR gate 49 connected to the lines 45 to receive the signals R, SA, SB and L.

The correlation or line modification signals are decoded in the unit 5 by the logic circuit 34 (FIG. 4) to produce one of the signals L, R, SA or SB which have the significance set out in Table II.

The logic circuit 35 (FIG. 2) responds in such manner as to produce a control signal on the line 21 which closes the gate 17 (FIG. 1) thereby to inhibit further clocking of the counter 14.

Referring now to FIG. 5, the timing pulses will still be applied to the line store 26 to cause the latter to transfer its content to the shift register 36 by way of the AND gates 41, 42 and 43. The opening of the gates 41, 42 and 43 is controlled by the signals R, L, SA, SB, on the lines 45. As will be seen from FIG. 5, the signal R is applied directly to the gate 41, the signals SA and SB are applied to the gate 42 by way of an OR gate 44, and the signal is applied directly to the gate 43.

Feed of the content of the line store 26 to the shift register will be controlled by the particular signal S, L, SA or SB appearing upon the line 45 and thus inserts a corresponding one into the shift register. Thus if the signal SA or SB is received the gate 42 will be opened and a 'one' will be applied to the register 36 at the stage 36C. That is to say a signal "P" will arrive at the line store 26 by way of the line 39 just one complete line scan behind the line scan which gave rise to the input to the AND gates 41, 42 and 43. It will be seen that the receipt of the signal L will open the gate 41, and thus apply a 'one' to the stage 36A whereby a signal (P + 1) will arrive at the register line store 26 by way of output line 39 one increment earlier so that a shift-left of the transition will have taken place. Similarly, the receipt of the signal R will open the gate 43, and thus insert a 'one' into the stage 36C so that the signal (P − 1) will arrive at the register line store 26 one increment earlier so that a right-shift of the transition will have been achieved.

The output on the line 39 is used to clock the counter 46 which latter is set according to the Table II by the signals R, SA, L SB applied by way of the line 45. As will be seen from the FIG. 5 the signals R, SA, L are applied by way of an OR gate 48 to the bit 1 portion of the counter, the SB signal is applied directly to the bit 2 position. In addition the signals are also applied to the LOAD position of the counter 46 by way of an OR gate 49, with the arrangement when the counter has counted down to zero a zero output signal is produced and is applied along the line 47 to the OR gate 8A (FIG. 2) to initiate the calling up of a further word from the store 2 (FIG. 1).

If the next word to be received is a so-called corellation code the above described procedure will be followed. That is to say the system treats the content of the store in the same manner as before. If the new word is a four bit word the bistable will be reset in the manner described and the circuit 35 will not produce the signal on the line 21 that closes the gate 17 to stop operation of the counter 14, and the sequence of events resulting from counter decrementing.

We claim:

1. A system for displaying graphics on a refreshed display device, the system comprising:

(a) a beam-type display device that exhibits a television raster scan-line pattern wherein the beam produces a display by repeatedly scanning successive generally parallel scan lines each constituted by a plurality of scan increments, the beam being controllable to produce at least first and second states of illumination from the display device;

(b) circuit means including clocking arrangements for causing the beam to repeatedly scan the said raster scan-line pattern;

(c) first storage means for storing date representing the entire display, said data comprising first code groups each designating a number of scan increments from one transition from one of said states of illumination to another of said states to the next such transition and second code groups each designating at least one correlation between corresponding transitions, in successively scanned lines, from one of said states of illumination to another of said states;

(d) second data storage means having a stage for each scan increment of a scan line, each stage holding data indicative of the state of illumination of that scan increment;

(e) means for feeding the contents of the second storage means to the display device to control the beam accordingly during the display of a scan line;

(f) means for receiving and decoding first code groups from the first storage means to produce first control signals each relating to a transition from one of said states of illumination to another of said states;

(g) means responsive to the first control signals for introducing into the second storage means, during the feeding to the display device of the contents of the second storage means relating to one scan line, data indicative of the state of illumination of at least one scan increment of the following scan line;

(h) means for receiving and decoding second code groups from the first storage means to produce second control signals relating the position of data to be displayed in a scan line to that of data displayed in the preceding scan line;

(i) means responsive to the second control signals for reintroducing into the second storage means, during feeding of the contents of the second storage means to the display device and in a position related to its previous position in accordance with the second control signals, data output from the second storage means; and (j) means, responsive to the presence in the data being reintroduced into the second storage means of data representing a transition from one state of illumination to another, for terminating said reintroduction.

2. A graphic display system as claimed in claim 1, in which the reintroducing means includes a shift register, a group of AND gates each having its output side connected to a respective one of the stages of the register, and at least two inputs, one of the inputs of each gate being connected in parallel to receive the output from the second storage means and a second input of each said gate being connected to receive a predetermined one of said second control signals whereby the output from the second storage means is directed into the shift register according to the content of the second control signals, and a connection between the output side of the shift register and the input side of said second storage means.

3. A graphic display system as claimed in claim 1 and including a decrementing counter having its input connected to receive the first control signals, and an output connected to the input side of the second storage means; said system also including a control gate interposed in the connection between the second storage means and the decrementing counter output side; said gate having a control signal input connected to receive a gate control signal which is produced by the means for decoding the first type code words on receipt of a said first code word and which opens the control gate to enable the output of the decrementing counter to be applied to the second storage means.

4. A graphic display system as claimed in claim 3, and including a second control gate which is normally open and which is interposed in the signal path to a second input of the decrementing counter, said second gate having a control input responsive to the second control signals, whereby the presence of a said second control signal closes the second control gate and thus inhibits the counting process of the decrementing counter.

5. A graphic display system as claimed in claim 2, in which the terminating means include a selectively settable counter having first inputs connected to receive some of said second control signals to that the count value set in the counter is determined by said second control signals, a decrementing input connected to receive as clocking signals the output from the shift register, whereby the counter is decremented by each signal representing a transition to a different state of illumination, and means responsive to a predetermined output from the counter for terminating the direction of the output of the second storage means into the shift register.

* * * * *